United States Patent Office 2,821,172
Patented Jan. 28, 1958

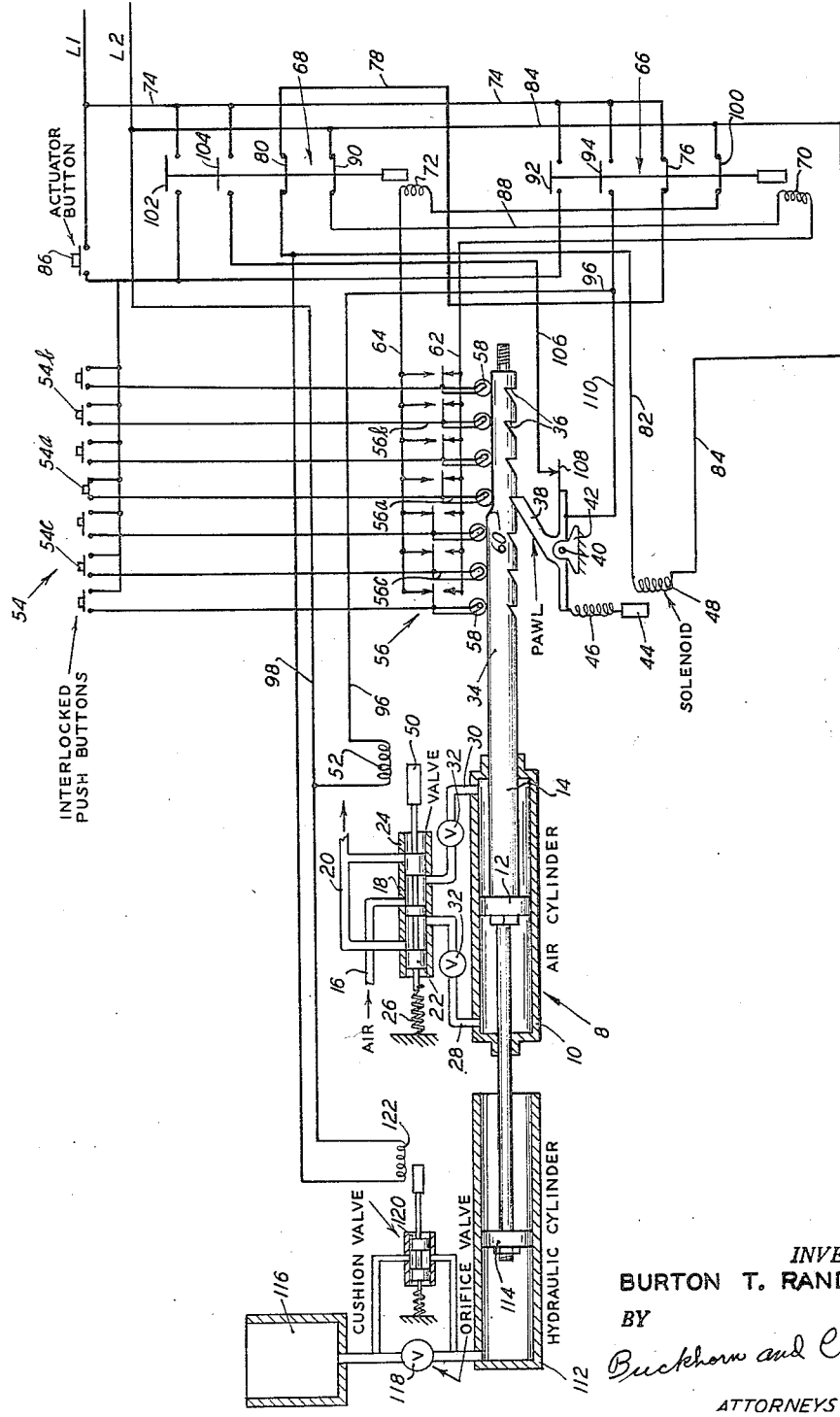

2,821,172

POWER OPERATED DEVICE FOR MOVING AN ELEMENT TO SELECTED POSITIONS

Burton T. Randall, Roseburg, Oreg., assignor to C. & D. Lumber Co., Riddle, Oreg., a partnership Application May 7, 1956, Serial No. 583,162

11 Claims. (Cl. 121—40)

This invention relates to a power operated device and more particularly to a device for causing a motor to selectively move a movable element to any selected position of a plurality of accurately predetermined positions and to hold said element in such selected position.

The device of the present invention includes a motor and a control system which normally causes said motor to exert a force in one direction so as to hold the movable element against a stop member in any one of a plurality of accurately predetermined positions. The device also includes a plurality of selecting means such as push buttons corresponding to each of the predetermined positions of the movable element. Actuation of any one of such selecting means causes the motor to move the movable element to the selected position. If the required movement is in the direction in which the motor normally urges the movable element against the stop member, the motor is controlled to first move the movable element in the opposite direction so as to facilitate release of its engagement with the stop member and, after such release, the motor is reversed to move the movable element to the selected position. At the selected position the stop member is again engaged by the movable member to stop and hold the movable element in the selected position. If the required movement of the movable element is in a direction opposite to that in which the motor normally urges the movable element, the motor is controlled to move the movable element in such opposite direction past the selected position. The motor is then reversed so that the movable element again engages the stop member and is stopped and held in the selected position. The movable element is thus held by the motor at all times against a definitely positioned stop member except when the movable element is actually being moved by the motor from one position to another. The power operated device of the present invention has utility wherever it is desired to move a member to selected positions, an example being the moving of edger saws in a sawmill edger.

It is therefore an object of the present invention to provide an improved power operated device which will move a movable element in either direction to a selected one of a plurality of predetermined positions and hold such element accurately in such position.

Another object of the invention is to provide a power operated device for moving a movable element in either direction to a selected position in which a motor is employed to urge the movable element in one direction against a stop member and in which the motor is always controlled to first move the movable element away from said stop member when moving said movable element to any other selected position.

A further object of the invention is to provide a power operated device in which a movable element is held in position against a stop member at any selected one of a plurality of predetermined positions by a biasing force applied thereto by a motor and in which the motor is controlled to remove such biasing force prior to movement of said movable element in the direction of said biasing force to another predetermined position in order to facilitate disengagement of said movable member and said stop member.

A still further object of the invention is to provide a power operated device in which a motor is controlled to hold a movable element against a stop member in any selected one of a plurality of predetermined positions and said movable element is moved past a selected position and then returned against the stop member when said movable element is moved by said motor to a selected position in a direction opposite to said biasing force.

Other objects and advantages of the invention will appear in the following description of a preferred embodiment shown in the attached drawings, which is a diagrammatic view of a power operated device including a control system in accordance with the present invention.

Referring more particularly to the drawing, the power operated device of the present invention includes a motor 8 shown as a compressed air motor having a double ended cylinder 10 containing a piston 12 secured to a piston rod 14. The piston rod 14 is shown as extending from both ends of the cylinder 10 and such cylinder 10 may have the usual packing glands (not shown) surrounding the piston rod 14. Compressed air from an air inlet pipe 16 may be admitted into either end of the cylinder 10 by means of a valve 18 and exhausted from the other end through such valve and an air discharge pipe 20. The valve 18 may be of any suitable type and is shown as a piston valve having a valve element 22 positioned within a valve casing 24 and held in the position shown in the drawings by a tension spring 26. The valve 18 is connected to the two ends of the cylinder 10 through the pipes 28 and 30 which may contain regulating valves 32 for controlling the speed of the piston 12 when the valve 18 is actuated to cause movement of such piston. In the position of the valve element 22 of the valve 18 shown in the drawing, the right end of the cylinder 10 is connected to the air inlet pipe 16 through the valve 18 and the left end of the cylinder 10 is connected to the air exhaust pipe 20 through the valve 18. In such position of the valve element 22, it is apparent that the piston 12 is urged toward the left in the drawing.

The piston rod 14 has a movable element 34 connected thereto, such movable element being shown in the drawing as a continuation of the piston rod 14. The movable element 34 has a longitudinally spaced abutment 36 positioned for engagement with a stop member in the form of a pawl 38 pivoted at 40 to a stationary member 42. In the position of the pawl shown in the drawing in which such pawl is in engagement with an abutment 36, the pawl holds the movable element 34 against movement to the left by the piston 12. The pawl 38 is biased away from the movable element 34 by gravity, or by a spring (not shown), so that release of the force tending to move the movable member to the left in the drawings will release the pawl 38 to allow it to be readily disengaged from an abutment 36 on the movable element. The pawl may be moved into the abutment engaging position shown in drawing by means of a solenoid plunger 44 connected to the pawl 38 through a tension spring 46, the structure being such that energization of the solenoid coil 48 will cause the solenoid plunger 44 to tension the spring 46 and return the pawl 38 from its released position to the position shown in the drawing.

The valve 18 may have its valve element 22 moved to reverse the motor 8 by means of a solenoid plunger 50 positioned to be moved to the right in the drawing whenever the solenoid coil 52 is energized. Upon movement of the valve element 22 of the valve 18 to the right under control of the solenoid coil 52, compressed air is admitted from the pipe 16 into the left end of the cylinder 10 through the pipe 28 and exhausted from the right end of the cylinder 10 through the pipe 20. This removes the biasing force on the movable element 34 to enable the pawl 38 to drop out of engagement with the abutments 36. Continued movement of the piston 12 to the right in the drawing will move the movable element 34 to the right. Also withdrawal of the pawl 38 from engagement with an abutment 36 conditions the movable element for movement to the left if the coil 52 of the valve 18 is deenergized.

The control circuit of the present invention includes a plurality of selectively operable push buttons 54, each of which corresponds to a predetermined position of the movable element 34 as determined by an abutment 36 engaging the pawl 38. The circuit also includes a plurality of cam actuated switches 56, there being a switch 56 corresponding to each push button 54 and to each abutment 36 on the movable element. The switches 56 are actuated by cam follower rollers 58 which engage the movable element 34, such element being provided with a cam surface including an inclined portion 60. Each of the switches 56 has a stationary contact connected to a conductor 62 and another stationary contact connected to a conductor 64 and also a contact movable by a cam follower roller 58 and electrically connected to one of the push buttons 54. The structure is such that the movable contacts of the switches 56 are in engagement with corresponding contacts connected to the conductor 62 when their cam follower rollers 58 are to the right of the inclined portion 60 of the movable element 34 and such that the movable contacts are in engagement with the contacts connected to the conductor 64 when their cam follower rollers are to the left of the inclined portion of the movable element 34. Thus, the switches to the left of the inclined portion 60 are in condition to complete a circuit through the conductor 64 and the switches to the right of the inclined portion 60 are in condition to complete a circuit through the conductor 62.

The control circuit also includes a pair of relays or contactors 66 and 68 having operating coils 70 and 72, respectively. The contacts of the relays 70 and 72 are shown in the position they occupy when the coils 70 and 72 are not energized, which is the condition of such coils when the movable element 34 is at rest in any one of its predetermined positions. Under these conditions, the coil 48 of the solenoid for holding the pawl 38 in position to be engaged by an abutment on the movable element 34 is energized and the energizing circuit can be traced from one side of the line L1 through conductor 74, normally closed contacts 76 of relay 66, conductor 78, normally closed contacts 80 of relay 68, conductor 82, solenoid coil 48 and conductor 84 to the other side of the line L2. At this time the coil 52 of the valve 18 is deenergized so that the piston 12 urges the movable element in a direction to hold one of its abutments 36 against the pawl 38. One of the push buttons 54a corresponding to a cam operated switch 56a is depressed but any circuit through the push button 54a and switch 56a is open at some other point in such circuit. The push buttons 54 are mechanically interlocked so that depression of any one of the push buttons releases any previously depressed push button and the last depressed push button remains depressed. Push button assemblies of this type are commercially available in various forms and such an assembly having any known or suitable interlocking mechanism may be employed. All of the push buttons are connected in series with an actuator button 86 so that preselection of a desired position of the movable element 34 can be effected by depressing the corresponding push button. Movement of the movable element to the preselected position can be thereafter initiated by depressing the actuator button.

If one of the other push buttons 54, to the right of the previously depressed push button 54a, for example, the push button 54b is depressed, and thereafter the actuator button 86 is depressed, a circuit is completed through the operating coil 70 of the relay 66. This circuit may be traced from the line L1 through the actuator button 86, the push button 54b, the closed lower contacts of the switch 56b, conductor 62, coil 70, conductor 88, normally closed contacts 90 of the relay 68, and conductor 84 to the other side of the line L2. The relay 66 is thereby operated and a circuit shunting the actuator button 86 is completed by closing the normally open contacts 92 of the relay 66 to retain the coil 70 of the relay 66 energized when the actuator button is released to thus retain the relay in operated position. A circuit is also completed through the coil 52 of the valve 18. This circuit may be traced from the line L1 through the conductor 74, closed normally open contacts 94 of the relay 66, conductor 96, operating coil 52 and conductor 98 to the other side of the line L2. The valve member 22 of the switch 18 is moved to the right in the drawings by energization of the coil 52 and this admits compressed air to the left end of the cylinder 10 of the motor 8 while exhausting air from the right end of the cylinder 10 to cause movement of the piston 12 and movable element 34 to the right in the drawing. The circuit energizing the solenoid coil 48 associated with the pawl 38 is also broken by opening of the normally closed contact 76 of the relay 66. This deenergizes the coil 48 to allow the pawl 38 to drop out of engagement with an abutment 36 of the movable element 34 as soon as the movable element starts to move.

When the movable element 34 moves a sufficient distance to cause its inclined cam surface 60 to raise the cam follower roller 58 of the switch 56b, the circuit through the energizing coil 70 of the relay 66 is broken at the lower contacts of the switch 56b. This enables the relay 66 to return to its normal position and such return immediately breaks the circuit through the operating coil 52 of the valve 18 by opening the contacts 94. At the same time, contacts 76 of the relay 66 are again closed to again complete the circuit through the solenoid coil 48 associated with the pawl 38. The inclined cam surface 60 on the movable element 34 is so related to the abutment 36 thereon that the piston 12 moves the movable element 34 somewhat beyond its desired predetermined position before the lower contacts of the switch 56b are opened so as to enable the pawl 38 to be moved into position to be engaged by corresponding abutment 36. The deenergization of the coil 52 allows the spring 26 to move the valve member 22 of the valve 18 to the left and again admit air under pressure into the right end of the cylinder 10 and exhausts air from the left end of the cylinder 10. The piston 12 is thus moved to the left and the movable element 34 is thereby moved to move such corresponding abutment 36 into engagement with the pawl 38 so as to hold the movable element in a predetermined position.

If a push button to the left of push button 54a, for example, push button 54c is depressed and the actuator button 86 also depressed, a circuit is completed through the actuating coil 72 of the relay 68. This circuit may be traced from the line L1 through actuator button 86, push button 54c, upper closed contacts of switch 56c, conductor 64, coil 72, normally closed contacts 100 of relay 66 and conductor 84 to the other side of the line L2. This causes operation of the relay 68 to complete a circuit shunting the actuator button 86 by closing normally open contacts 102 to thus hold the relay 68 in operated position. Operation of the relay 68 also completes a circuit through the coil 52 of the valve 18. Such circuit may be traced from line L1 through the conductor 74, closed normally open contacts 104 of the relay 68, conductor 106, the closed contacts of a switch 108 associated with the pawl 38, conductor 110, conductor 96, coil 52 and conductor 98 to the other side of the line L2. At the same time the circuit through the solenoid coil 48 associated with the pawl 38 is broken by opening of the normally closed contacts 80. Energization of the coil 52 causes movement of the valve member 22 to the right in the drawing and resulting movement of the piston 12 and movable element 34 to the right. This enables the pawl 38 to drop out of engagement with an abutment 36 of the movable element 34. Pawl 38 pivots in a clockwise direction in the drawing and causes opening of the switch 108 which is in series with the coil 52 of the valve 18 in the circuit traced above. Such coil is deenergized and the valve member 22 of the valve 18 moves to the left to cause movement of the piston 12 to the left to move the movable element 34 until the cam follower roller 58 corresponding to switch 56c is lowered by the inclined cam surface 60 of the movable element 34. The circuit through the operating coil 72 of the relay 68 is opened at the upper contacts of the switch 56b. The relay 68 returns to its normal position and the normally closed contacts 80 thereof complete the circuit through solenoid coil 48 to cause the pawl 38 to be pivoted into position to be engaged by the abutment 36 corresponding to the push button 54c. The movable element 34 is thus stopped in an accurately predetermined position corresponding to the push button 54c. Thus, depression of any push button followed by depression of the actuator button causes movement of the movable element 34 to an accurately predetermined position corresponding to such push button, and such movement is always initially in a direction to allow the pawl 38 to be withdrawn from engagement with an abutment of the movable element 34 and also any movement to the right of the movable element 34 is continued past the desired predetermined position in order to enable the pawl 38 to be positioned to engage an abutment 36 on the movable element 34.

Since normally closed contacts 90 of the relay 68 are in series with the operating coil 70 of the relay 66 and normally closed contacts 100 are in series with the operating coil 72 of the relay 68, it is impossible to actuate both relays at the same time. In general, depression of a push button requiring a change of direction of the movable element when the movable element is being moved by the piston 12 will result in stopping of the movement at the next predetermined position to the left and will require another actuation of the actuator button to cause the movable element to move to the station corresponding to the last depressed button. On the other hand, if the depression of a button is such as to not require a change of direction of the movable element, the movable element will be moved continuously to the last selected position.

The movement of the piston 12 and movable element 34 to move an abutment 36 into engagement with the pawl 38 may result in abrupt stopping of the movable element 34 and in some cases it is desirable to provide a cushioning or dashpot mechanism such as a cylinder 112 and piston 114. Such dashpot may be of the hydraulic type and operate only during the final movement of the movable element 34 to engage an abutment 36 thereon against the pawl 38. Thus, the cylinder 114 may be single-ended and have its interior connected to a source 116 of hydraulic fluid through an orifice valve 118. The valve 118 may be by-passed by a normally open valve 120 such that flow of hydraulic fluid between the cylinder 114 and the source of supply 116 is normally substantially unimpeded. The valve 120 may, however, be closed during the final movement of the movable member 34 to engage an abutment 36 thereon against the pawl 38 so as to cause hydraulic fluid to be exhausted from the cylinder 114 through the orifice valve 118 to cushion such movement. This is accomplished by connecting the operating coil 122 of the solenoid operated valve 120 in parallel with the solenoid coil 48 associated with the pawl 38. Whenever the pawl 38 is rotated in a clockwise direction in the drawings by the solenoid plunger 44 acting through the spring 46, the valve 120 is closed so that the final movement of the movable element 34 to the left in the drawing, when the pawl 38 is in position to be engaged by an abutment 36, is hydraulically cushioned.

The operation of the power operated device should be apparent from the above description. Such operation is initiated by depressing the actuator button 86. Prior to such actuation of the actuator button, a desired position of the movable element 34 has been preselected by depressing any one of the interlocked push buttons 54. Such push button remains depressed and releases any previously depressed push button. When the actuator button is depressed, one of the relays 66 or 68 is operated depending upon the position of the cam operated switch 56 corresponding to the depressed push button of the push buttons 54. The relay completes a locking circuit which holds the relay in operated position until such cam operated switch 56 is moved to its alternative position by the cam portion 60 of the movable element. The piston 12 normally urges the movable element 34 to the left in the drawings to hold one of its abutments 36 against the pawl 38. The first result of operating either relay 66 or 68 is to energize the coil of valve 18 and deenergize the coil 48 of pawl 38. This causes movement of the piston 12 to the right and release of the pawl 38. If the depressed push button requires continued movement of the movable member to the right, it is relay 66 which is operated and the movement continues past the desired predetermined position. A switch 56 corresponding to the depressed push button is then operated to allow relay 66 to return to its normal position. Valve 18 returns to its normal position and the piston 12 is moved to the left. At the same time the pawl 38 is pivoted by the solenoid coil 48 into position to be engaged by an abutment 36 on the movable member. If the depressed push button requires movement to the left, it is relay 68 which is operated. The piston 12 first moves to the right and the pawl 38 drops out of engagement with the movable member. This opens switch 108 and the piston 12 moves to the left until a switch 56 is operated to allow relay 68 to return to its normal position. This causes the pawl 38 to be pivoted into position to engage an abutment 36 on the movable member. Every time the pawl is thus pivoted by the solenoid coil 48, the valve 120 is operated by its coil 102 to restrict the discharge of hydraulic fluid from the cylinder 12 and thus cushion the final movement of the movable member 34 against the pawl 38.

While the motor 8 has been shown as a pneumatically operated motor of the type including a double ended cylinder, it should be apparent that either end of the cylinder may be omitted with the corresponding half of the valve 18 and the piston 12 urged in one direction by any suitable resilient means, such as a spring forming part of the motor. Also, other types of motors with appropriate controls can be employed instead of a pneumatic motor. In all cases the motor exerts a force on a movable member in one direction to hold such movable member against a stop member in any selected one of a plurality of predetermined positions and the initial movement of the motor in all cases is in a direction to release the force on the stop member to facilitate disengagement between the movable member and the stop member. Also, the final direction of motion of the motor is such as to move the movable member toward the stop member.

While I have disclosed the preferred embodiment of my invention, it is to be understood that the details of the invention may be varied and that the invention is to be limited only by the scope of the following claims.

I claim:

1. A power operated device including a movable element and means for selectively moving said element to any one of a plurality of predetermined positions and stopping said element in said positions, said means comprising motor means, means controlling said motor means to apply a force to said element urging said element in one direction when said element is stopped in any of said positions, stop means engaging said element for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said stop means, means for thereafter controlling said motor means to move said element in said one direction, and means for reengaging said stop means with said element when said element reaches said selected position.

2. A power operated device including a movable element and means for selectively moving said element to any one of a plurality of predetermined positions and stopping said element in said positions, said means comprising motor means, means controlling said motor means to apply a force to said element urging said element in one direction when said element is stopped in any of said positions, stop means engaging said element for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said stop means, means responsive to release of said stop means for thereafter controlling said motor means to move said element in said one direction, and means for reengaging said stop means with said element when said element reaches said selected position.

3. A power operated device including a movable element and means for selectively moving said element to any one of a plurality of predetermined positions and stopping said element in said positions, said means comprising motor means, means controlling said motor means to apply a force to said element urging said element in one direction when said element is stopped in any of said positions, stop means engaging said element for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said stop means, means for thereafter controlling said motor means to move said element in said one direction, means for reengaging said stop means with said element when said element reaches said selected position, and means operating at the time said stop means is reengaged with said element to cushion the stopping of said element.

4. A power operated device including a movable element and means for selectively moving said element to any one of a plurality of predetermined positions and stopping said element in said positions, said means comprising motor means, means controlling said motor means to apply a force to said element urging said element in one direction when said element is stopped in any of said positions, stop means engaging said element for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said stop means, means for thereafter controlling said motor means to move said element in said one direction, and means for reengaging said stop means with said element when said element reaches said selected position, said selecting means also including means operating when said selectng means requires movement of said element in said opposite direction to control said motor means to move said element in said opposite direction past said selected position to facilitate reengagement of said stop means with said element and to thereafter control said motor means to apply said force in said first direction to move said element into engagement with said stop means.

5. A power operated device including a movable element and means for selectively moving said element to any one of a plurality of predetermined positions and stopping said element in said positions, said means comprising motor means, means controlling said motor means to apply a force to said element urging said element in one direction when said element is stopped in any of said positions, stop means engaging said element for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said stop means, means for thereafter controlling said motor means to move said element in said one direction, and means for re-engaging said stop means with said element when said element reaches said selected position, said selecting means also including means operating when said selecting means requires movement of said element in said opposite direction to control said motor means to move said element in said opposite direction past said selected position to facilitate reengagement of said stop means with said element and to thereafter control said motor means to apply said force in said first direction to move said element into engagement with said stop means, said device also having means to cushion the movement of said element into engagement with said stop means.

6. A power operated device including movable element and means for moving said element to any one of a plurality of predetermined positions and stopping said element in said positions, said means comprising motor means, means controlling said motor means to apply a force to said element urging said element in one direction when said element is stopped in any of said positions, stop means for holding said element in any one of said positions against said force, selecting means controlling said motor means to move said element to any other selected one of said positions including means operating when said selecting means requires movement of said element in a direction opposite to said one direction to control said motor means to move said element in said opposite direction past said selected position to facilitate reengagement of said stop means with said element, means for reengaging said stop means with said element including means to control said motor means to apply said force in said one direction to move said element against said stop means.

7. A power operated device including a movable element and means for moving said element to any one of a plurality of predetermined positions and stopping said element in said positions, said means comprising pneumatic motor means, means controlling said motor means to apply a force to said element urging said elements in one direction when said element is stopped in any of said positions, stop means for holding said element in any one of said positions against said force, selecting means including a push button corresponding to each of said positions for controlling said motor means to move said element to any other selected one of said positions including means operating when said selecting means requires movement of said element in one direction to control said motor means to first move said element in a direction opposite to said one direction, means for releasing said stop means, means for thereafter controlling said motor means to move said element in said one direction, and means including a cam on said movable element and a cam operated switch corresponding to each of said push buttons for reengaging said stop means with said element when said element reaches said selected position.

8. A power operated device including a movable element and means for moving said element to any one of a plurality of predetermined positions and stopping said element in said positions, said means comprising pneumatic motor means for moving said element when said element is stopped in any of said positions, means controlling said motor means to apply a force to said element urging said elements in one direction, stop means including spaced abutments on said element and a pawl engaging said abutments for holding said elements in any one of said positions against said force, selecting means controlling said motor means to move said element to any other selected one of said positions including means operating when said selecting means requires movement of said element in said one direction to control said motor means to first move said element in a direction opposite to said one direction, means for releasing said pawl from said element, means for thereafter controlling said motor means to move said element in said one direction, and means for moving said pawl into position to be engaged by an abutment on said element when said element reaches said selected position.

9. A power operated device including a movable element and means for moving said element to any one of a plurality of predetermined positions and stopping said element in said positions, said means comprising pneumatic motor means, means controlling said motor means to apply a force to said element urging said element in one direction when said element is stopped in any of said positions, stop means including spaced abutments on said element and a pawl for engaging said abutments for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said pawl from said element, means for thereafter controlling said motor means to move said element in said first direction, said selecting means also including means operating when said selecting means requires movement of said element in said opposite direction to control said motor means to move said element in said opposite direction past said selected position to facilitate reengagement of said pawl with one of said abutments and to thereafter control said motor means to move said element in said one direction, and means to position said pawl to be engaged by one of said abutments when said element reaches said selected position.

10. A power operated device including a movable element and means for moving said element to any one of a plurality of predetermined positions and stopping said element in said positions, said means comprising pneumatic motor means, means controlling said motor means to apply a force to said element urging said element in one direction when said element is stopped in any of said positions, stop means including spaced abutments on said element and a pawl for engaging said abutments for holding said element in any one of said positions against said force, selecting means controlling said motor means to move said element to any other selected one of said positions including means operating when said selecting means requires movement of said element in said opposite direction to control said motor means to move said element in said opposite direction past said selected position to facilitate reengagement of said pawl with one of said abutments and to thereafter control said motor means to move said element in said one direction, and means to position said pawl to be engaged by one of said abutments when said element reaches said selected position.

11. A power operated device including a movable element and means for moving said element to any one of a plurality of predetermined positions and stopping said element in said positions, said means comprising pneumatic motor means, means controlling said motor means to apply a force to said element urging said element in one direction when said element is stopped in any of said positions, stop means including spaced abutments on said element and a pawl for engaging said abutments for holding said element in any one of said positions against said force, selecting means controlling said motor means to move said element to any other selected one of said positions including means operating when said selecting means requires movement of said element in said one direction to control said motor means to first move said element in a direction opposite to said one direction, means for releasing said pawl from said element, means for thereafter controlling said motor means to move said element in said first direction, said selecting means also including means operating when said selecting means requires movement of said element in said opposite direction to control said motor means to move said element in said opposite direction past said selected position to facilitate reengagement of said pawl with one of said abutments and to thereafter control said motor means to move said element in said one direction, means to position said pawl to be engaged by one of said abutments when said element reaches said selected position, said device having normally inoperative cushioning means, and means to render said cushioning means operative during the final movement of said element in a direction to engage one of said abutments with said pawl.

References Cited in the file of this patent

UNITED STATES PATENTS

| Number | Name | Date |
|---|---|---|
| 524,541 | Dewson | Aug. 14, 1894 |
| 1,683,175 | Falcke | Sept. 4, 1928 |
| 2,039,186 | Pieper | Apr. 28, 1936 |
| 2,314,444 | Crittenden | Mar. 23, 1943 |
| 2,467,026 | Giger | Apr. 12, 1949 |